(12) United States Patent
Lerner

(10) Patent No.: US 11,615,675 B2
(45) Date of Patent: Mar. 28, 2023

(54) VISUALIZATION AND ANALYSIS OF NUMERICAL DATA RELATING TO SPORTING EVENTS

(71) Applicant: Irie Films, Inc., Oak Park, CA (US)

(72) Inventor: Garrett Lerner, Oak Park, CA (US)

(73) Assignee: IRIE FILMS, INC., Oak Park, CA (US)

( * ) Notice: Subject to any disclaimer, the term of this patent is extended or adjusted under 35 U.S.C. 154(b) by 225 days.

(21) Appl. No.: 17/016,047

(22) Filed: Sep. 9, 2020

(65) Prior Publication Data

US 2022/0076537 A1 Mar. 10, 2022

(51) Int. Cl.
*G06F 3/0481* (2022.01)
*G06F 3/0484* (2022.01)
(Continued)

(52) U.S. Cl.
CPC ...... *G07F 17/3288* (2013.01); *G06F 3/04817* (2013.01); *G06F 3/04842* (2013.01); *G07F 17/323* (2013.01)

(58) Field of Classification Search
CPC .............. G07F 17/3288; G07F 17/323; G06F 3/04817; G06F 3/04842; G06F 3/0481; G06F 3/04847
See application file for complete search history.

(56) References Cited

U.S. PATENT DOCUMENTS

| | | | | |
|---|---|---|---|---|
| 2005/0187644 A1* | 8/2005 | Neale | ...................... | G07F 17/32 700/91 |
| 2008/0268951 A1* | 10/2008 | Gropp | ................... | A63F 13/828 463/31 |

(Continued)

Primary Examiner — Jennifer N Welch
Assistant Examiner — Parmanand D Patel
(74) Attorney, Agent, or Firm — Gardella Grace P.A.

(57) ABSTRACT

A system and method for importing and visualizing numerical data relating to sporting events, wherein numerical data related to sporting events may be imported from any number of internet-based statistics compilers and rendered as a graphical representations allowing for convenient analysis of the data by the user. The graphical representations are primarily pie charts, wherein each slice of the pie chart corresponds to, for example, a position group, a specific player, or a type of points-scoring play. Users may make selections from one or more dropdown menus to generate pie charts and these selections may produce any number of comparisons, visualizations, or analyses. For example, a user may compare various numerical and statistical data for a single professional sports team, and further, to sort and compare those data by position group, by player, by season, or by game. Further, a user may make selections to directly compare the data relating to a first professional athlete to the data relating to a second professional athlete. Further still, a user may make selections to compare a professional sports team's performance across the duration of a previously played season against the performance of all other teams in the professional league across the duration of the previously played season, and further, to examine the performance of a particular player on the professional sports team across the duration of a previously played season. These analyses, among others, are graphically represented as pie charts and may be augmented by various additional functionalities, for example, mouse-over functionalities, clickable features, pop-ups, animations, three-dimensional renderings, video replays, among other functionalities. These analyses are generated from real-world professional sports data but may be compiled for purposes related to various online fantasy sports leagues.

1 Claim, 10 Drawing Sheets

(51) Int. Cl.
*G07F 17/32* (2006.01)
*G06F 3/04842* (2022.01)
*G06F 3/04817* (2022.01)

(56) References Cited

U.S. PATENT DOCUMENTS

2014/0219570 A1* 8/2014 Hanish .................... G06T 7/246
  382/201
2015/0005076 A1* 1/2015 Stephenson, Jr. ..... A63F 13/828
  463/42

* cited by examiner

VISUALIZATION AND ANALYSIS OF NUMERICAL DATA RELATING TO SPORTING EVENTS

SUMMARY OF ILLUSTRATIVE EMBODIMENTS

In some implementations, the present disclosure may be directed to a system and method for importing and visualizing numerical data relating to sporting events. The numerical data relating to sporting events may be imported from any number of internet-based statistics compilers or fantasy sports leagues. A fantasy sport is a type of internet-based game, wherein participants select and assemble a virtual team of players corresponding to real players of a professional sport. The real-world statistical performance of each player in real-world games may be converted to a points or scoring system for the user-assembled virtual team, and the user may participate in a virtual league against other users' teams. Various points or scoring systems may be manually or computationally tabulated for a virtual league of user-assembled teams such that user-assembled teams compete against each other in a virtual season or virtual tournament. Fantasy sports competitions may be played across various lengths of time, e.g. for a single week of a season or for the entire duration of a season of a given professional sports league. Historically, numerical and statistical data relating to real-world sporting events has been summarized in various media, publications, and graphical representations as a "box score," containing a convenient summary of a sporting event that is easily interpretable by a user. Box scores typically resemble a spreadsheet comprising rows and columns of numbers representing the results of a sporting event.

In some implementations, the system disclosed herein may be configured to visualize various numerical and statistical data relating to sporting events and be useful for visualizing data relating to fantasy sports leagues, including names of players, positions of players, and the professional team that the player is on. In some implementations, the system is configured to display a comparison of the statistics for one player or team directly against the statistics for another different player or team.

In some implementations, the system comprises a graphical user interface (GUI). The GUI may be displayed in a web browser, may be displayed within a computer application, or may be displayed by an application on a mobile device. In some implementations the GUI may comprise dropdown menus, toggle switches, sliding switches, radial buttons, or various other means of selecting and displaying numerical and statistical data.

In a preferred implementation, the numerical and statistical data are displayed primarily by one or more pie charts. Each pie chart may comprise one or more segments or slices corresponding to user-defined categories designated by color. Segments or slices may be further divided into sub-segments or sub-slices. Segments or slices may be further labeled alphanumerically. In some implementations, the arc length of each segment of the pie chart is proportional to a first quantity that the segment represents. In preferred implementations the radius of each segment is also proportional to an additional quantity that the segment represents, such that more than one class of numerical or statistical data may be represented by a single segment. In preferred implementations, the results of a sporting event may be summarized by a "pie score," i.e., a graphical representation of the results of a sporting event comprising pie charts that summarize the results of the sporting event and the relative contributions of various players, positions groups, and plays to one or more team's results for one or more real-world sporting events. The "pie score" enables the user to conveniently view and analyze the results of one or more real-world sporting events while interacting with and manipulating the display to render increasingly informative graphical information relating to the one or more sporting events.

In some implementations, segments of a pie chart may be further divided into sub-segments. Each sub-segment may have a unique arc length and radius, each corresponding to a numerical or statistical data point associated with the sub-segment. For example, a pie chart may represent a sports team, wherein the color-coded segments of the pie chart represent different player positions of the sports team and each sub-segment corresponds to an individual player on the sports team.

In some implementations, the pie charts may be equipped with further functionalities including mouse-over functionality, exploded views, clickable functionalities, animations, 3-D renderings, video replays, or other functionalities, each of which may be selected by the user to display additional levels of information corresponding to the segments or sub-segments.

In some implementations, the GUI display may include one or more dropdown menus with user-selectable options. The GUI display may include one, two, three, four, five, six, seven, eight, nine, ten, or more dropdown menus. In a preferred implementation, the dropdown menus may correspond to categories including "statistics," "team," "position," "player," "compare to," "$2^{nd}$ player," and "fantasy scoring."

In some implementations, the system disclosed herein may be configured to display numerical data and statistics relating to any number of sporting events, including high school sporting events, college sporting events, professional sporting events, international sporting events, among others. The system disclosed herein may be configured to display numerical data and statistics relating to any number of sports, including but not limited to American football, basketball, baseball, ice hockey, among others. In some implementations, the system disclosed herein may be configured to display numerical data and statistics relating to professional American football games. The numerical data and statistics may represent performance of a professional football player or a professional football team. The numerical data and statistics displayed by the system disclosed herein may include total points, total touchdowns, rushing touchdowns, passing touchdowns, rushing attempts, rushing yards, rushing touchdowns, pass attempts, passing yards, passing touchdowns, total receiving targets, red zone receiving targets, deep receiving targets, receiving targets per game, total receptions, total receiving yards, total opportunities (wherein an opportunity corresponds to the number of runs plus the number of pass targets), opportunities per game (total opportunities divided by the number of games played by that player), total weighted opportunities, weighted opportunities per game, red zone opportunities (inside the 20 yard line), opportunities inside the 10 yard line, opportunities inside the 5 yard line, and snap counts.

In some implementations, the system disclosed herein may be configured to display the playing position for each player. The system may also be configured to filter a virtual team's statistics by player position. For example, a user may select from a menu to display a virtual team's total touchdowns, and further select from an additional menu "wide receiver" to display only total touchdowns scored by the virtual team's wide receivers and leaving out touchdowns scored by players of any other positions. Player position designations may include quarterback (QB), running back (RB), wide receiver (WR), tight end (TE), running back/wide receiver/tight end (RB/WR/TE), and kicker (K).

In some implementations, the system disclosed herein may include a comparison function, wherein the numerical and statistical data relating to sports for one team may be compared the data for a second different team. In another implementation, the numerical and statistical data for one player may be compared to the data for a second different player. In some implementations, the user may select from a menu comprising various comparison functions. The comparison functions may include, for example, compare to none, compare to all teams, compare to one other team, or compare a team to itself. Compare to none will generate one pie chart for the team that the user has already selected.

In an implementation the user may select to compare a team to all teams. The user may wish to visualize the numerical and statistical data of a selected team compared to the numerical and statistical data for all teams in the league. When "compare to all teams" is selected, the system may generate three pie charts. A first and largest pie chart may be anchored to the left side of the visual display, a second and smallest pie chart may be anchored the right side of the visual display, and a third pie chart representing the selected team's data will appear at the center of the visual display between the first and the second pie charts. Each pie chart or portions of each pie chart will be represented as proportionately larger or smaller depending on the magnitude of the statistic represented for each category of the pie chart. In some implementations, a horizontal line may connect the first and largest pie chart to the second and smallest pie chart, with the logo of each of the teams of the league positions along the line in a descending order from the largest pie chart to the smallest pie chart, corresponding to the statistics for each team. In an implementation an arrow will point from the selected team's pie chart to where the selected team falls on the horizontal line corresponding to the statistics of the selected team.

In another implementation the user may choose to compare a first selected team to a second selected team. The user may wish to visualize the numerical and statistical data of a first selected team compared to the numerical and statistical data for second selected team. When "compare to one other team" is selected, the system may generate two pie charts which may be visually represented side by side. The pie charts may be proportionate in size, corresponding to the numerical and statistical data of the first selected team and the second selected team.

The forgoing general description of the illustrative implementations and the following detailed description thereof are merely exemplary aspects of the teachings of this disclosure and are not restrictive. As noted above, certain embodiments within the scope of this disclosure and the claims may not provide the particular advantages set forth above. That said, the most preferred embodiments provide many, most or all of the foregoing advantages relative to conventional swim-in-place devices.

BRIEF DESCRIPTION OF THE DRAWINGS

The accompanying drawings, which are incorporated in and constitute a part of the specification, illustrate one or more embodiments and, together with the description, explain these embodiments. The accompanying drawings have not necessarily been drawn to scale. Any values dimensions illustrated in the accompanying graphs and figures are for illustration purposes only and may or may not represent actual or preferred values or dimensions. Where applicable, some or all features may not be illustrated to assist in the description of underlying features. In the drawings:

FIG. 2A further includes an exploding pie chart that represents increasingly detailed numerical and statistical data for a selected position group.

DETAILED DESCRIPTION OF ILLUSTRATIVE EMBODIMENTS

Figure 1:
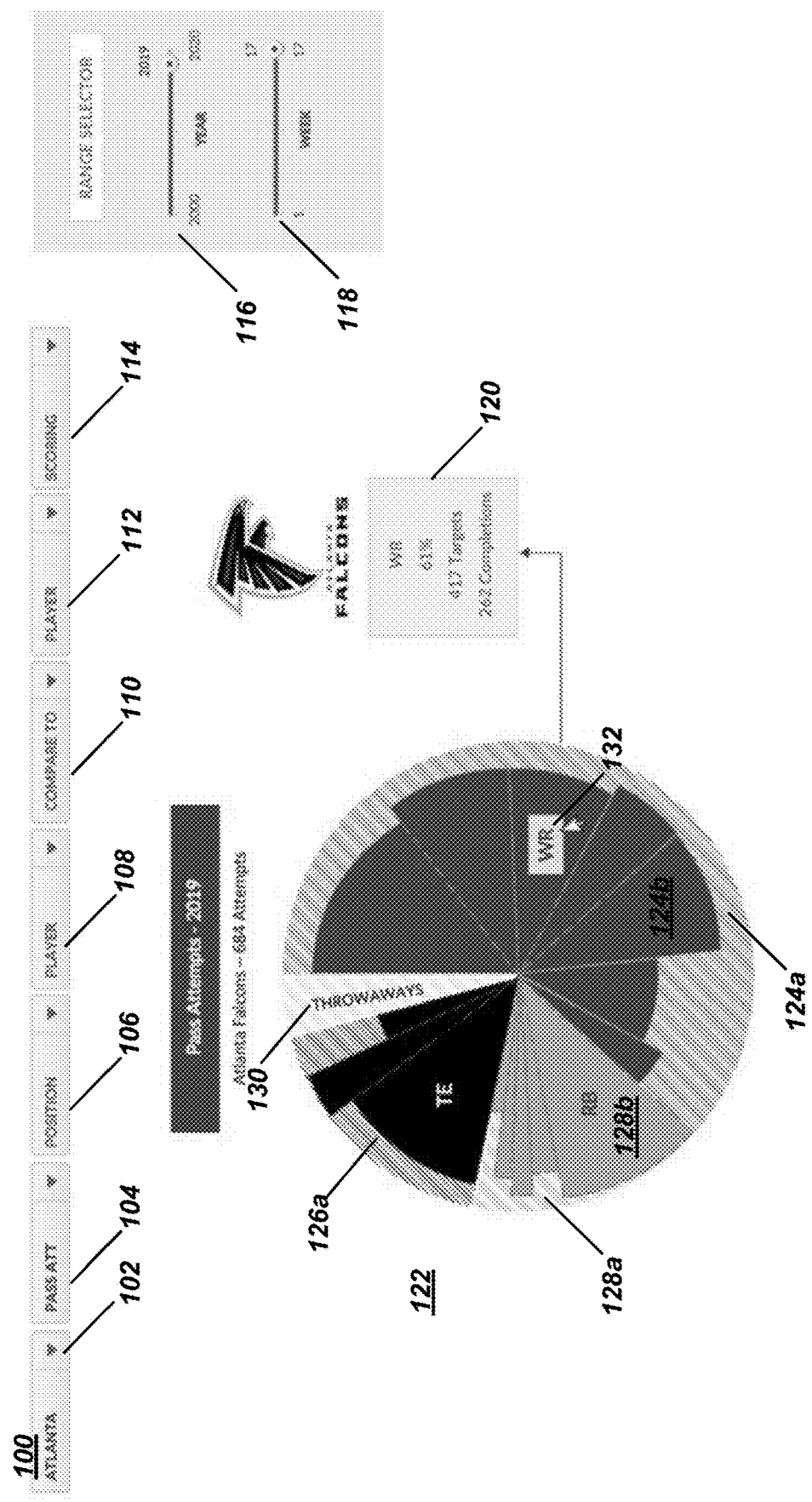
FIG. 1 is a depiction of a GUI interface for visualizing numerical and statistical data related to a sports league, comprising various charts, pulldown menus, sliders, toggle switches, wherein the user has selected a specific team and a specification category of statistics for visualization.

The description set forth below in connection with the appended drawings is intended to be a description of various, illustrative embodiments of the disclosed subject matter. Specific features and functionalities are described in connection with each illustrative embodiment; however, it will be apparent to those skilled in the art that the disclosed embodiments may be practiced without each of those specific features and functionalities.

Reference throughout the specification to "one embodiment" or "an embodiment" means that a particular feature, structure, or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments. Further, it is intended that embodiments of the disclosed subject matter cover modifications and variations thereof.

It must be noted that, as used in the specification and the appended claims, the singular forms "a," "an," and "the" include plural referents unless the context expressly dictates otherwise. That is, unless expressly specified otherwise, as used herein the words "a," "an," "the," and the like carry the meaning of "one or more." Additionally, it is to be understood that terms such as "left," "right," "top," "bottom," "front," "rear," "side," "height," "length," "width," "upper," "lower," "interior," "exterior," "inner," "outer," and the like that may be used herein merely describe points of reference and do not necessarily limit embodiments of the present disclosure to any particular orientation or configuration. Furthermore, terms such as "first," "second," "third," etc., merely identify one of a number of portions, components, steps, operations, functions, and/or points of reference as disclosed herein, and likewise do not necessarily limit embodiments of the present disclosure to any particular configuration or orientation.

Furthermore, the terms "approximately," "about," "proximate," "minor variation," and similar terms generally refer to ranges that include the identified value within a margin of 20%, 10% or preferably 5% in certain embodiments, and any values therebetween.

All of the functionalities described in connection with one embodiment are intended to be applicable to the additional embodiments described below except where expressly stated or where the feature or function is incompatible with the additional embodiments. For example, where a given feature or function is expressly described in connection with one embodiment but not expressly mentioned in connection with an alternative embodiment, it should be understood that the inventors intend that that feature or function may be deployed, utilized or implemented in connection with the alternative embodiment unless the feature or function is incompatible with the alternative embodiment.

Referring now to FIG. 1, an implementation of a GUI including visual representations of numerical and statistical data relating to a sports league is shown and described. In brief overview, the depicted visual representations are presented on a screen, wherein a pie chart representing user-selected data is presented in the center of the screen and various dropdown menus, switches, and buttons line the top and edges of the screen. In some implementations, when a user opens or launches the GUI, dropdown menus 102, 104, 106, 108, 110, 112, and 114 are displayed. Dropdown menu 102 present options for "teams," dropdown menu 104 presents options for "statistics," dropdown menu 106 present options for "position," dropdown menu 108 presents options for "player," dropdown menu 110 presents options for "compare to," dropdown menu 112 presents options for "$2^{nd}$ player," and dropdown menu 114 presents options for "fantasy scoring." A user may begin by clicking dropdown menu 102 and selecting from it a team. In an implementation, a user may make a selection from dropdown menu 102, for example a user may select "Atlanta" which is then displayed as team name 100, Upon making a selection from dropdown menu 102 a pie chart 122 will be generated at the center of the display. In some implementations, a user may set default selections for the system such that when the GUI a particular team is already selected from dropdown menu 102 and a particular statistic is already selected form dropdown menu 104, e.g. pass attempts as a default selection as depicted in FIG. 1. Slider 116 may be manipulated by the user to select a date range for the numerical and statistical data displayed in the pie chart and slide 118 may be manipulated by the user to select a range of weeks of data for any given year or years. In some implementations, for example during a professional sports league's off season, sliders 116 and 118 default to selecting the previous year and all weeks for that year, respectively. In another implementation, for example during a professional sports league's playing season, sliders 116 and 118 default to selecting the current year and all weeks to date, respectively.

Pie chart 122 is divided into four regions or slices 124a, 126a, 128a, and 130, labeled in four different colors. In some implementations the colors default to correspond to the selected team's uniform colors in the professional sports league. In some implementations, as a default setting, three of the slices each correspond to each of three positions groups and the fourth slice represents pass attempts that were throwaways. As depicted in FIG. 1, slice 124a represents pass attempts for wide receivers (WR), slice 126a represents pass attempts for tight ends (TE), slice 128a represents pass attempts for running backs (RB), and slice 130 represents pass attempts that were throwaways. Each slice is further divided into sub-slices, each sub-slice representing an individual player within the slices that represent position groups. For example, sub-slice 124b represents a single wide receiver within slide 124a, which comprises seven total players, each represented by an individual sub-slice. For an individual player, e.g. for the individual wide receiver represented by sub-slice 124b, the dark shaded portion of the sub-slice represent the passes that the player was able to successfully catch, and the hashed area represents the pass targets they were not able to catch, i.e. the radius of the dark shaded portion of the sub-slice proportionately corresponds to the player's rate of successfully received passes. As shown in FIG. 1, a mouse cursor is hovering over the "WR" label 132 of slice 124a, an action which in some implementations generates a pop-up window 120 that displays additional information for the position group, e.g. number of targets, number of completions, percentage of completions.

Figure 2A:
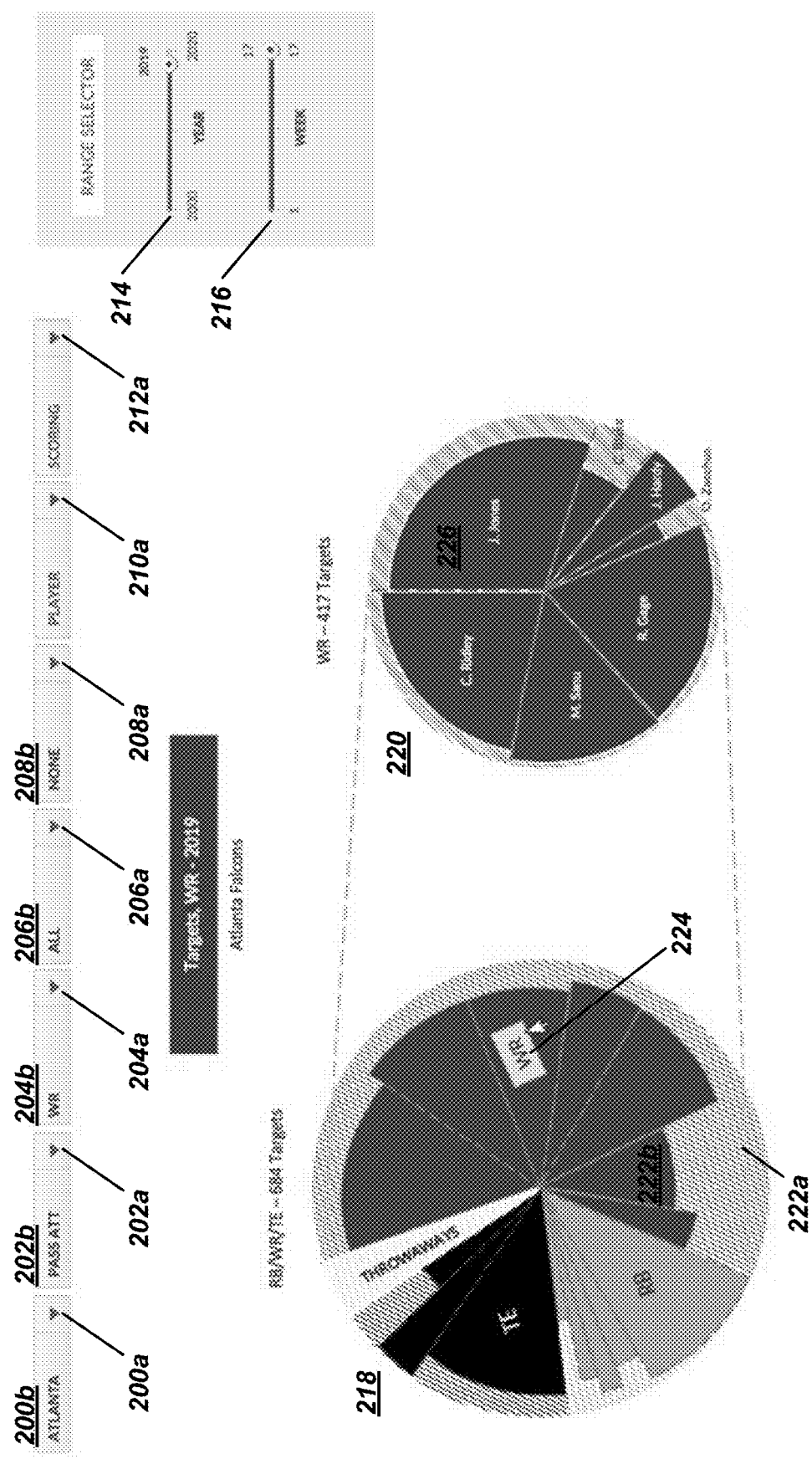
FIG. 2A is a depiction of a GUI interface for visualizing numerical and statistical data related to a sports league, comprising various charts, pulldown menus, sliders, toggle switches, wherein a user has made selections to visualize, examine, and compare various numerical and statistical data for a single professional sports team, and further, to sort and compare those data by position group, by player, by season, or by game.

In some implementations, rather than only hovering a mouse cursor over the label 132 of a slice as described for slice 124a above, a user may click on the label, an action which generates a new pie chart such as the exploding pie chart 220 depicted in FIG. 2A. In some implementations clicking on label 132 of pie chart 122 depicted in FIG. 1 generates an exploding pie chart 220 depicted in FIG. 2A. In another implementation, the same action may be accomplished by clicking dropdown menu 106 and clicking "WR," the position designation that corresponds to slice 122 and label 132.

In an implementation, clicking label 132 generates the GUI depicted in FIG. 2A and allows the user to visualize, examine, and compare various numerical and statistical data for a single professional sports team, and further, to sort and compare those data by position group, by player, by season, or by game. For example, a user may wish to visualize a team's total targets across the duration of the 2019 season, sort the data by position group, and further sort the data by individual players in that position group. Turning now to FIG. 2A, a GUI including visual representations of data for such a scenario are shown and described. In an implementation, the GUI includes dropdown menus 200a, 202a, 204a, 206a, 208a, 210a, and 212a. Dropdown menu 200a presents options for "teams," dropdown menu 202a presents options for "statistics," dropdown menu 204a present options for "position," dropdown menu 206a presents options for "player," dropdown menu 208a presents options for "compare to," dropdown menu 210a presents options for "$2^{nd}$ player," and dropdown menu 212a presents options for "fantasy scoring." Unless otherwise stated, the functionalities of these features as described above in connection with FIG. 1 apply to FIG. 2A, with the additional features and functionalities discussed below. A skilled artisan will understand that the functionalities of features described above in connection with FIG. 1 are similarly provided by the corresponding elements of FIG. 2A. The GUI further includes sliders 214 and 216. Slider 214 may be manipulated by the user to select a date range for the numerical and statistical data displayed in pie charts 218 and 220, and slider 216 may be manipulated by the user to select a range of weeks of data for any given year.

In an implementation, the user may begin by launching the GUI in a web browser, within a computer application, or within an application on a mobile device. The display may be blank except for dropdown menus 200a, 202a, 204a, 206a, 208a, 210a, and 212a, and sliders 214 and 216. The user may proceed by making a selection from dropdown menu 200a, e.g., the user may make a selection 200b, Atlanta Falcons, from dropdown menu 200a, teams. The user may then proceed by making a selection from dropdown menu 202a, e.g., the user may make a selection 202b, total targets, from dropdown menu 202a, statistics. Upon the user's selection from both dropdown menus 200a and 200b, the system nay produce and display pie chart 218. Pie chart 218 may be divided into slices, wherein each slice represents a portion of a team's total statistic certain category, e.g., a total statistic broken down by position group. Further, each slice is further divided into sub-slices, wherein each sub-slice represents the statistic for an individual player within that category, e.g., each player within a team's group of wide receivers. For example, slice 222a represents total targets for wide receivers of the Atlanta Falcons across the duration of the 2019 season, and sub-slice 222b represents the total targets for an individual wide receiver across the duration of the 2019 season. The arc length of sub-slice 222b proportionate to the share of the team's total targets that the individual player represents.

In some implementations, the GUI may contain additional functionalities, e.g., mouse-over functionalities, clickable features, pop-ups, animations, three-dimensional renderings, among other functionalities. In an implementation, a user may hover a mouse cursor over a portion of pie chart 218 or pie chart 220 to visualize additional statistics. For example, a user may hover a mouse cursor over sub-slice 222b, an action which in some implementations generates a pop-up window containing the name of the player represented by sub-slice 222b. Further, a user may use a mouse cursor to click on sub-slice 222b, an action which in some implementations generates a pop-up window containing the player's name and additional numerical and statistical information corresponding to the data represented by sub-slice 222b. Further still, a user may use a mouse cursor to click on label 224 within slice 222a, an action which in some implementations may result in animation which moves pie chart 218 from the center of the display to the left half of the display and generates an additional exploding pie chart 220. In some implementations the creation of pie chart 220 may be animated as if to appear that pie chart 220 emerges or explodes from slice 222a, suggesting to the user that the data represented by pie chart 220 is a more detailed representation of the data represented by slice 222a and that the data represented by pie chart 220 is derived from the data represented by slice 222a.

In an implementation, a user may use a mouse cursor to click on slice 226, an action which in some implementations generates a pop-up window containing the player's name and additional numerical and statistical information corresponding to the player's performance for the time period selected using sliders 214 and 216 and according to the selections made using the dropdown menus as discussed above. The pop-up window may further include the player's performance for the statistics selected by dropdown menu 202a, for example, selection 202b, total targets. In an implementations, clicking slice 226 will produce a numerator and a denominator corresponding to the player's performance for the statistic selected, e.g. clicking slice 226 will produce the statistic 156/417 targets for the player J. Jones, indicating that of the wide receivers playing for the Atlanta Falcons during the 2019 season, J. Jones accounts for 156 of 417 total targets for wide receivers. In contrast, if a user uses a mouse cursor to click on sub-slice 222b which also represents data for J. Jones, the statistic 156/684 will be presented in the pop-up window, indicating that of all the athletes playing for the Atlanta Falcons during the 2019 season, J. Jones accounts for 156 of 684 total targets for athletes of all positions. Pie chart 218 represents data for players of all positions, while pie chart 220 represents data only for wide receivers.

Figure 2B:
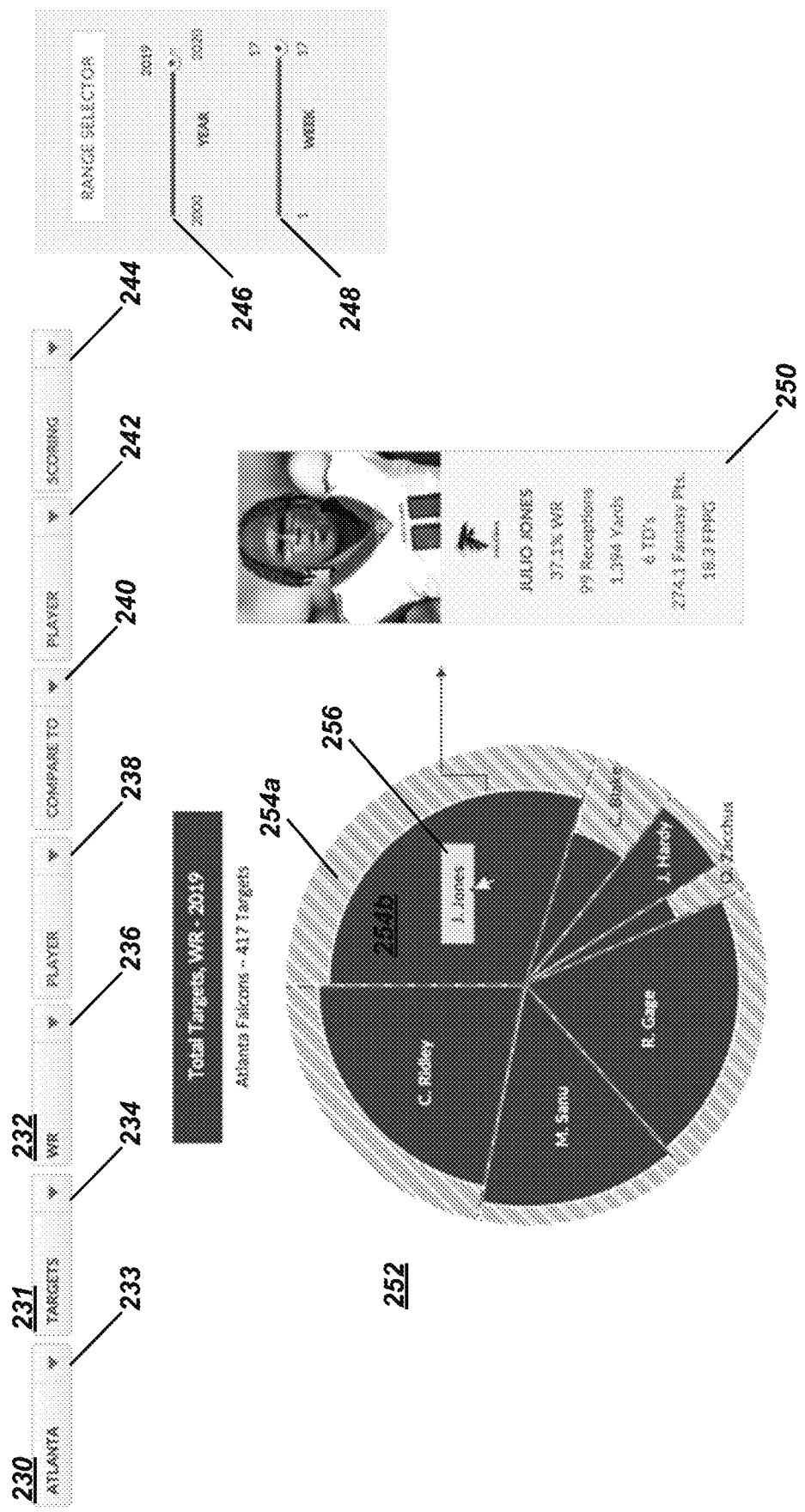
FIG. 2B is a depiction of a GUI interface for visualizing numerical and statistical data related to a sports league, comprising various charts, pulldown menus, sliders, toggle switches, wherein the user has selected a specific team, a specific category of statistics, and a specific position group for visualization.

In an implementation, a user may wish to view only pie chart 220. The GUI may be equipped with a further functionality wherein the user may toggle between viewing pie chart 218 alone, viewing both pie charts 218 and 220, and viewing pie chart 220 alone. The GUI may be manipulated to utilize various functionalities including pop-ups, animations, three-dimensional renderings, shading, translucency of graphics, transparency of graphics, among other functionalities. In an implementation, viewing pie chart 220 alone may allow the user to view increasingly detailed data relating to the position group selected and individual players within that position group. Turning now to FIG. 2B, a further visualization of pie chart 220 representing numerical and statistical data relating to a sports league of increasing detail relative to that represented in FIG. 2A is shown and described. Pie chart 252 of FIG. 2B corresponds to pie chart 220 of FIG. 2A.

In some implementations, the GUI includes dropdown menus 233, 234, 236, 238, 240, 242, and 244. Dropdown menu 233 presents options for "teams," dropdown menu 234 presents options tor "statistics," dropdown menu 236 present options for "position," dropdown menu 238 presents options for "player," dropdown menu 240 presents options for "compare to," dropdown menu 242 presents options for "$2^{nd}$ player," and dropdown menu 244 presents options for "fantasy scoring." Unless otherwise stated, the functionalities of these features as described above in connection with FIG. 1 apply to FIG. 2B, with the additional features and functionalities discussed below. A skilled artisan will understand that the functionalities of features described above in connection with FIG. 1 are similarly provided by the corresponding elements of FIG. 2B. Unless otherwise stated, the functionalities of pie chart 122 as described above in connection with FIG. 1 apply to pie chart 252 depicted in FIG. 2B, however pie chart 252 represents only the pass attempts that went to the wide receiver position group, rather than visualizing passing data for multiple position groups. Further, pie chart 252 is divided into slices, each slice representing single player within the selected position group, e.g., slice 254a represents passing data for wide receiver "J. Jones." Similar to pie chart 122 depicted in FIG. 1, the radius of the dark shaded portion of the slice proportionately corresponds to the player's rate of successfully received passes, e.g., the radius of dark shaded portion 254b represents the rate of pass targets that player "J. Jones" was able to catch and the hashed area represents the rate of their targets that were incomplete. Note that for dropdown menu 233 the user has selected "Atlanta," for dropdown menu 234 the user has selected "targets" and for dropdown menu 236 the user has selected "WR (wide receiver)." This selection reduces the total pass attempts represented in pie chart 252 compared to pie chart 122, because only passing data for the wide receiver position group is being displayed. Each slice is labeled with the name of the player whose data is represented by the slice, e.g. slice 254a comprises label 256 for "J. Jones."

In some implementations, the user may hover a mouse cursor over the label of the slice, e.g. the user may hover a mouse cursor over label 256 within slice 254a. This action in some implementations generates a pop-up window 250 that displays additional information for the player whose data is represented by the slice, e.g. number of targets, number of completions, percentage of completions, total yards of passes received, total touchdowns, total fantasy points, among other additional data. In some implementations, a user may use a mouse cursor to click pop-up box 250, an action which navigates to a player page displaying additional data and information about the player including height, weight, injury history, college attended, career history, career statistics, among others.

In some implementations, a user may wish to compare the numerical data and statistics of a first player directly against the numerical data and statistics of a second player. For example, a user may wish to directly compare the data for wide receiver J. Jones—represented by slice 254a of pie chart 252 depicted in FIG. 2B—against another wide receiver in the professional football league. Returning to FIG. 2B, a user may utilize the "compare to" function of dropdown menu 240 to directly compare data of two players. From the display depicted in FIG. 2B, a user may optionally click dropdown menu 238 and select the name of a first player to compare, or may click the label of the players names within the slice representing that player's data, e.g. a user may click label 256 to select the player "J. Jones" as a first player for comparison. A user may then click dropdown menu 240 which will display a list of professional sports teams from which the user may choose a team name, e.g. "New Orleans Saints." The user may then proceed to click dropdown menu 242 which will display choices for a second player to compare. Having already selected from dropdown menu 236 position group 232 "wide receiver," dropdown menu 242 will only display names of wide receivers from the team selected in dropdown menu 240. Upon selecting a team from dropdown menu 240 the system filters for position group to display only players comprising that position group on the selected team. A user may then select from dropdown menu 242 a second play for direct comparison, for example "Michael Thomas" of the New Orleans Saints. This selection changes the first pie chart display and generates a second pie chart display that is presented directly next to the first pie chart as depicted in FIG. 3.

Figure 3:
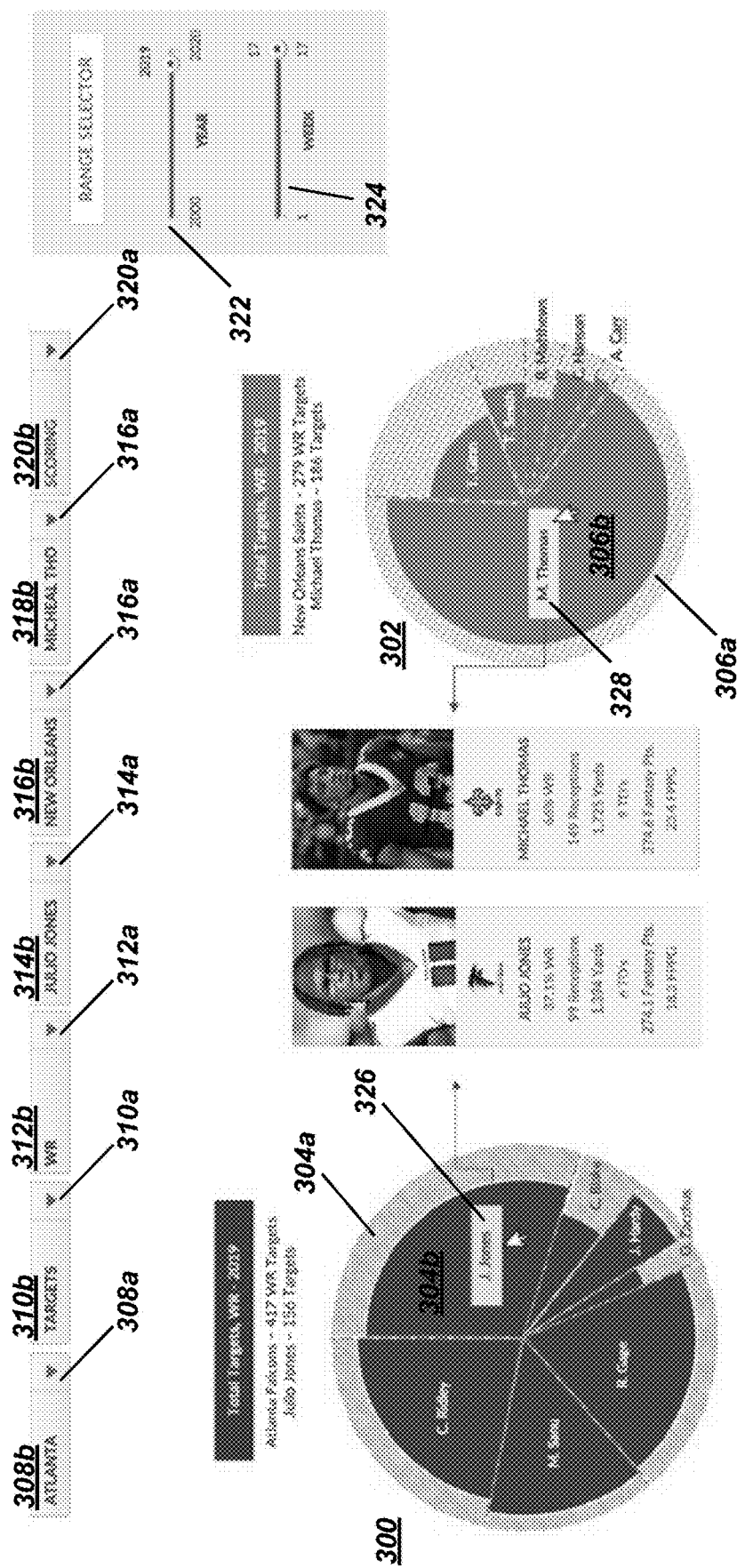
FIG. 3 is a depiction of a GUI interface for visualizing numerical and statistical data related to a sports league, comprising various charts, pulldown menus, sliders, toggle switches, wherein a user has made selections to directly compare the data relating to a first professional athlete to the data relating to a second professional athlete.

Turning now to FIG. 3, an implementation of a GUI including visual representations of numerical and statistical data relating to a sports league is shown and described. In some implementations, the GUI includes dropdown menus 308a, 310a, 312a, 314a, 316a, 318a, and 320a. Dropdown menu 308a presents options for "teams," dropdown menu 310a presents options for "statistics," dropdown menu 312a present options for "position," dropdown menu 314a presents options for "player," dropdown menu 316a presents options for "compare to," dropdown menu 318a presents options for "$2^{nd}$ player," and dropdown menu 320 presents options for "fantasy scoring." Unless otherwise stated, the functionalities of these features as described above in connection with FIG. 1 apply to FIG. 3, with the additional features and functionalities discussed below. A skilled artisan will understand that the functionalities of features described above in connection with FIG. 1 are similarly provided by the corresponding elements of FIG. 3. Unless otherwise stated, the functionalities of pie chart 122 as described above in connection with FIG. 1 apply to pie charts 300 and 302 depicted in FIG. 3, however pie chart 300 represents data for just one first player and pie chart 302 represents data for just one second player, and the data of the two pie charts may be directly compared and visualized as discussed below.

In an implementation, pie chart 300 represents passing data for a single player, J Jones, and pie chart 302 represents passing data for a single player, M. Thomas. Since the user has selected J. Jones, either by selecting from dropdown menu 208 or by clicking label 226 of FIG. 2, other players' information drops away to reveal a clear representation of just that data for J. Jones represented by pie chart 300 with statistics including number of targets, number of completions, percentage of completions, total yards of passes received, total touchdowns, total fantasy points, among other additional data displayed. To the right of pie chart 300, pie chart 302 represents passing data for M. Thomas with statistics including number of targets, number of completions, percentage of completions, total yards of passes received, total touchdowns, total fantasy points, among other additional data displayed. In an implementation, selection 308b, Atlanta Falcons, has been made from dropdown menu 308a, teams; selection 310b, targets, has been made from dropdown menu 310a, statistics; selection 312b, wide receiver (WR), has been made from dropdown menu 312a, position; selection 314b, J. Jones, has been made from dropdown menu 314a, 1$^{st}$ player; selection 316b, New Orleans Saints, has been made from dropdown menu 316a, compare to; selection 318b, M. Thomas, has been made from dropdown menu 318a, 2$^{nd}$ player; selection 320b, points per reception (PPR), has been made from dropdown menu 320a, fantasy scoring. These selections by the user direct the system to generate pie charts 300 and 302 and visualize the numerical and statistical data for the selections made.

It will be readily apparent to the user upon visual inspection that pie chart 302 has a smaller total area than pie chart 300, representing that the Atlanta Falcons have a larger number of total targets (417) than the New Orleans Saints (279). However, the arc length of slice 304a representing data for J. Jones is significantly smaller than the arc length of slice 306a representing data for M. Thomas, indicating that M. Thomas accounts for a much higher fraction of his team's total targets than J. Jones does of his team's. Further, similar to pie chart 122 depicted in FIG. 1, the radius of the dark shaded portion 304b of slice 304a and the radius of the dark shaded portion 306b of slice 306a each proportionately correspond to the respective player's rate of successfully received passes, e.g., the radius of dark shaded portion 304b represents the rate of pass targets that player J. Jones was able to catch and the hashed area represents the rate of their targets that were incomplete. Upon visual inspection of both the arc lengths of slices 304a and 306a and the radii of shaded portions 304b and 306b, a user will be able to directly compare the proportion of a team's targets a player is responsible for, and their successful pass rate.

Figure 4:
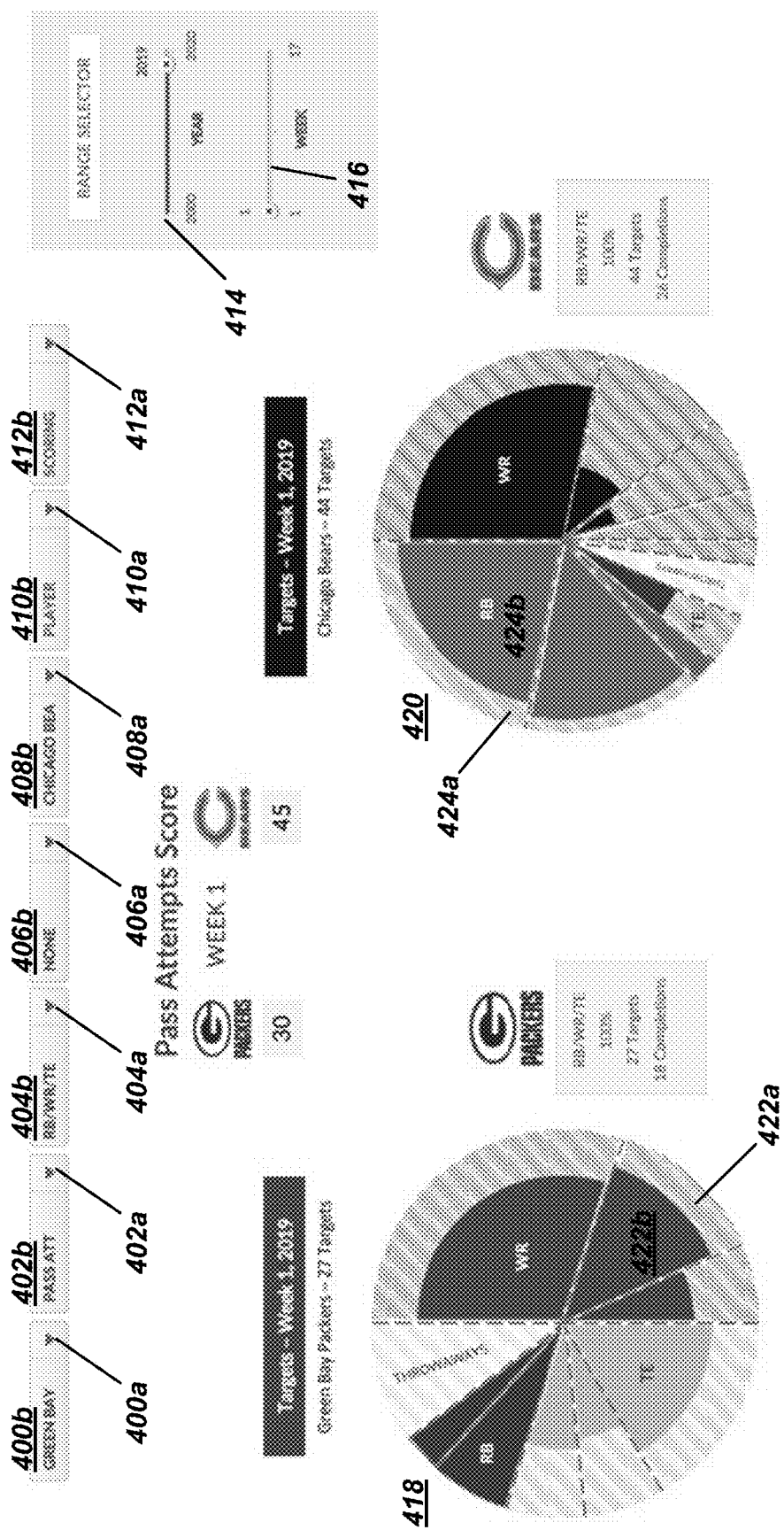
FIG. 4 is a depiction of a GUI interface for visualizing numerical and statistical data related to a sports league, comprising various charts, pulldown menus, sliders, toggle switches, wherein a user has made selections to visualize and compare data relating to two opposing professional football teams during a single game in a past season.

In another implementation, a user may wish to examine various numerical and statistical data for previously played professional sporting events, e.g. compare passing attempt statistics for two opposing professional football teams during a single game in a past season. Turning now to FIG. 4, a GUI including visual representations of data for such a scenario are shown and described. In an implementation, the GUI includes dropdown menus 400a, 402a, 404a, 406a, 408a, 410a, and 412a. Dropdown menu 400a presents options for "teams," dropdown menu 402a presents options for "statistics," dropdown menu 404a present options for "position," dropdown menu 406a presents options for "player," dropdown menu 408a presents options for "compare to," dropdown menu 410a presents options for "2$^{nd}$ player," and dropdown menu 412a presents options for "fantasy scoring." Unless otherwise stated, the functionalities of these features as described above in connection with FIG. 1 apply to FIG. 4, with the additional features and functionalities discussed below. A skilled artisan will understand that the functionalities of features described above in connection with FIG. 1 are similarly provided by the corresponding elements of FIG. 4. The GUI further includes sliders 414 and 416. Slider 414 may be manipulated by the user to select a date range for the numerical and statistical data displayed in pie charts 418 and 420 and slider 416 may be manipulated by the user to select a range of weeks of data for any given year.

In an implementation, for the scenario described above, i.e., a user wishing to compare passing attempt statistics for two opposing professional football teams during a single game in a past season, the following selections may be made by the user: selection 400b, Green Bay Packers, may be made from dropdown menu 400a, teams; selection 402b, pass attempts, may be made from dropdown menu 402a, statistics; selection 404b, RB/WR/TE (i.e. any position), may be made from dropdown menu 404a, position; selection 406b, none, may be made from dropdown menu 406a, 1$^{st}$ player; selection 408b, Chicago Bears, may be made from dropdown menu 408a, compare to; selection 410b, all, may be made from dropdown menu 410a, 2$^{nd}$ player; selection 412b, Yahoo! scoring, may be made from dropdown menu 412a, fantasy scoring. Slider 414 is positioned at the year 2019 and slider 416 is positioned at week #1 of the 2019 season. These selections by the user may direct the system to generate pie charts 418 and 420 and visualize the numerical and statistical data for the selections made.

Based on the selections discussed above, the user is now able to derive numerical and statistical information for the two selected teams based on visual inspection of pie charts 418 and 420 and is able to make direct comparisons of the two teams. Because the user made selection 406b, none, from dropdown menu 406a, 1$^{st}$ player, pie chart 418 is divided into slices corresponding to position group. For example, slice 422a represents data for all wide receivers on the Green Bay Packers, with wide receivers accounting for 50% of the teams passing attempts, with 15 targets and 9 completions. The radius of the shaded portion 422b represents the rate of completions for pass attempts made to wide receivers on the Green Bay Packers. Because the user Evade selection 410b, all, from dropdown menu 410a, 2$^{nd}$ player, pie chart 420 is divided into slices corresponding to every player of the Chicago Bears. For example, slice 424a represents data for wide receiver A. Robinson of the Chicago Bears, with A. Robinson accounting for 28.9% of the teams passing attempts, with 13 targets and 7 completions. The radius of the shaded portion 424b represents the rate of completions for pass attempts made to A. Robinson of the Chicago Bears.

Figure 5:
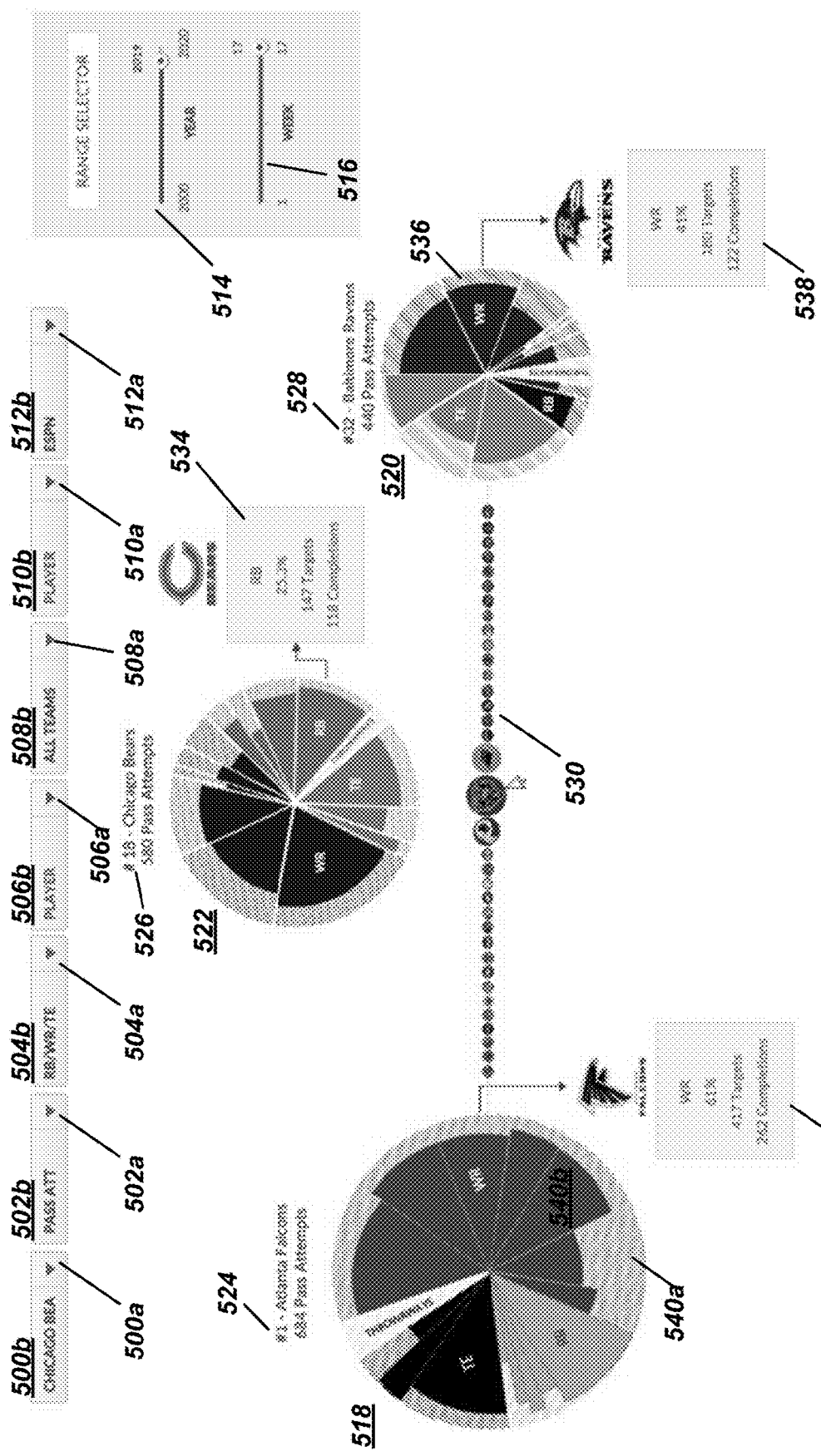
FIG. 5 is a depiction of a GUI interface for visualizing numerical and statistical data related to a sports league, comprising various charts, pulldown menus, sliders, toggle switches, wherein a user has made selections to visualize and compare a professional football team's performance across the duration of a previously played season against the performance of all other teams in the professional league across the duration of the previously played season, and further, to examine the performance of a particular player on the professional football team across the duration of a previously played season.

In another implementation, a user may wish to examine various numerical and statistical data for previously played professional sporting events, e.g. compare a professional football team's performance across the duration of a previously played season against the performance of all other teams in the professional league across the duration of the previously played season. The user may further wish to examine the performance of a particular player on the professional football team across the duration of a previously played season. Turning now to FIG. 5, a GUI including visual representations of data for such a scenario are shown and described. In an implementation, the GUI includes dropdown menus 500a, 502a, 504a, 506a, 508a, 510a, and 512a. Dropdown menu 500a presents options for "teams," dropdown menu 502a presents options for "statistics," dropdown menu 504a present options for "position," dropdown menu 506a presents options for "player," dropdown menu 508a presents options for "compare to," dropdown menu 510a presents options for "2$^{nd}$ player," and dropdown menu 512a presents options for "fantasy scoring," Unless otherwise stated, the functionalities of these features as described above in connection with FIG. 1 apply to FIG. 5, with the additional features and functionalities discussed below. A skilled artisan will understand that the functionalities of features described above in connection with FIG. 1 are similarly provided by the corresponding elements of FIG. 5. The GUI further includes sliders 514 and 516. Slider 514 may be manipulated by the user to select a date range for the numerical and statistical data displayed in pie charts 518, 520, and 522, and slider 516 may be manipulated by the user to select a range of weeks of data for any given year.

In an implementation, for the scenario described above, i.e., a user wishing to compare a professional football team's performance across the duration of a previously played season against the performance of all other teams in the professional league across the duration of the previously played season, and further, to examine the performance of a particular player on the professional football team across the duration of a previously played season, the following selections may be made by the user: selection 500b, Chicago Bears, may be made from dropdown menu 500a, teams; selection 502b, pass attempts, may be made from dropdown menu 502a, statistics; selection 504b, RB/WR/TE (i.e. any position), may be made from dropdown menu 504a, position; selection 506b, Tarik Cohen, may be made from dropdown menu 506a, $1^{st}$ player; selection 508b, all teams, may be made from dropdown menu 508a, compare to; selection 510b, none, may be made from dropdown menu 510a, $2^{nd}$ player; selection 512b, ESPN scoring, may be made from dropdown menu 512a, fantasy scoring. Slider 514 is positioned at the year 2019 and slider 516 is positioned to span all 17 weeks of the 2019 season. These selections by the user may direct the system to generate pie charts 518, 520, an and visualize the numerical and statistical data for the selections made.

In an implementation, pie charts 518, 520, and 522 are positioned along a continuous line 530, in descending order of total pass attempts by professional team from left to right. As indicated by its left-most position on line 530 and label 524, the Atlanta Falcons have the most total pass attempts (684) in the league, ranking $1^{st}$, and the pass attempt data for the Atlanta Falcons is represented by pie chart 518. As indicated by its right-most position on line 530 and label 528, the Baltimore Ravens have the fewest total pass attempts (440) in the league, ranking $32^{nd}$, and the pass attempt data for the Baltimore Ravens is represented by pie chart 520. Because the user has made selection 500b, Chicago Bears, from dropdown menu 500a, pie chart 522 representing pass attempt data for the Chicago Bears is positioned in the center of the display and an arrow point to continuous line 530 indicates the relative rank of the Chicago Bears in the league with respect to total pass attempts. Label 526 also represents the relative rank of the team, indicating the team ranks $14^{th}$ in total pass attempts (580).

In an implementation, because the user has made selection 506b, Tarik Cohen, from dropdown menu 506a, the shaded portion 530 of slice 530a is highlighted, and in some implementations may be depicted as a three-dimensional pop-out, as an animated feature, or with other functionalities to visually highlight the data for Tarik Cohen to the user. Further, because the user has made selection 506b, Tarik Cohen, from dropdown menu 506a, pop-up window 532 is displayed containing additional numerical and statistical data for player Tarik Cohen across the duration of the previously played season.

In some implementations, the GUI displaying data comparing a professional football team's performance across the duration of a previously played season against the performance of all other teams in the professional league across the duration of the previously played season, and further, displaying the performance of a particular player on the professional football team across the duration of a previously played season may contain additional functionalities, e.g., mouse-over functionalities, pop-ups, animations, three-dimensional renderings, among other functionalities. In an implementation, a user may wish to derive additional information with respect to a team's distribution of pass attempts to one or more position groups. For example, a user may hover their mouse cursor over slice 540a, causing pop-up window 542 to appear for the duration that the mouse cursor is hovered over slide 540a. Pop-up window 542 may comprise additional numerical and statistical information corresponding to the data represented by slice 540a, i.e., pass attempts for the wide receiver position group of the Atlanta Falcons across the duration of a previously played season. In an implementation, a user may wish to derive additional information with respect to a second team's distribution of pass attempts to one or more position groups. For example, a user may hover their mouse cursor over slice 536, causing pop-up window 538 to appear for the duration that the mouse cursor is hovered over slice 536. Pop-up window 538 may comprise additional numerical and statistical information corresponding to the data represented by slice 536, i.e., pass attempts for the wide receiver position group of the Baltimore Ravens across the duration of a previously played season. In an implementation, a user may wish to derive additional information with respect to a third team's distribution of pass attempts to one or more position groups. For example, a user may hover their mouse cursor over pie chart 522, causing pop-up window 534 to appear for the duration that the mouse cursor is hovered over pie chart 522. Pop-up window 534 may comprise additional numerical and statistical information corresponding to the data represented by pie chart 522, i.e., pass attempts for the running back position group of the Chicago Bears across the duration of a previously played season.

In an implementation, the above-described functionalities allow the user to make multi-dimensional direct comparisons between multiple teams or multiple players for a given data type, e.g., for comparisons of pass attempt data between the $1^{st}$ ranked Atlanta Falcons, $14^{th}$ ranked Chicago Bears, and $32^{nd}$ ranked Baltimore Ravens, and for selected position groups or players within these teams. In an implementation, slices of the pie charts are further divided into sub-slices, e.g., slice 540a representing pass attempt data for wide receivers of the Atlanta Falcons is divided into several sub-slices representing individual player data demarcated by dashed lines, including sub-slice 540b. In an implementation, a user may wish to derive additional information with respect to an individual player's pass attempt data across the duration of a previously played season. For example, a user may hover their mouse cursor over sub-slice 540b, causing pop-up window 542 to appear for the duration that the mouse cursor is hovered over sub-slice 540b. Pop-up window 542 may comprise additional numerical and statistical information corresponding to the data represented by sub-slice 540b, i.e., pass attempts data for the individual player J. Jones of the Atlanta Falcons across the duration of a previously played season. By visual inspection, a user may make direct comparisons between the pass attempt data for J. Jones and the pass attempt data for other teams, position groups of teams, or other individual players.

Figure 6:
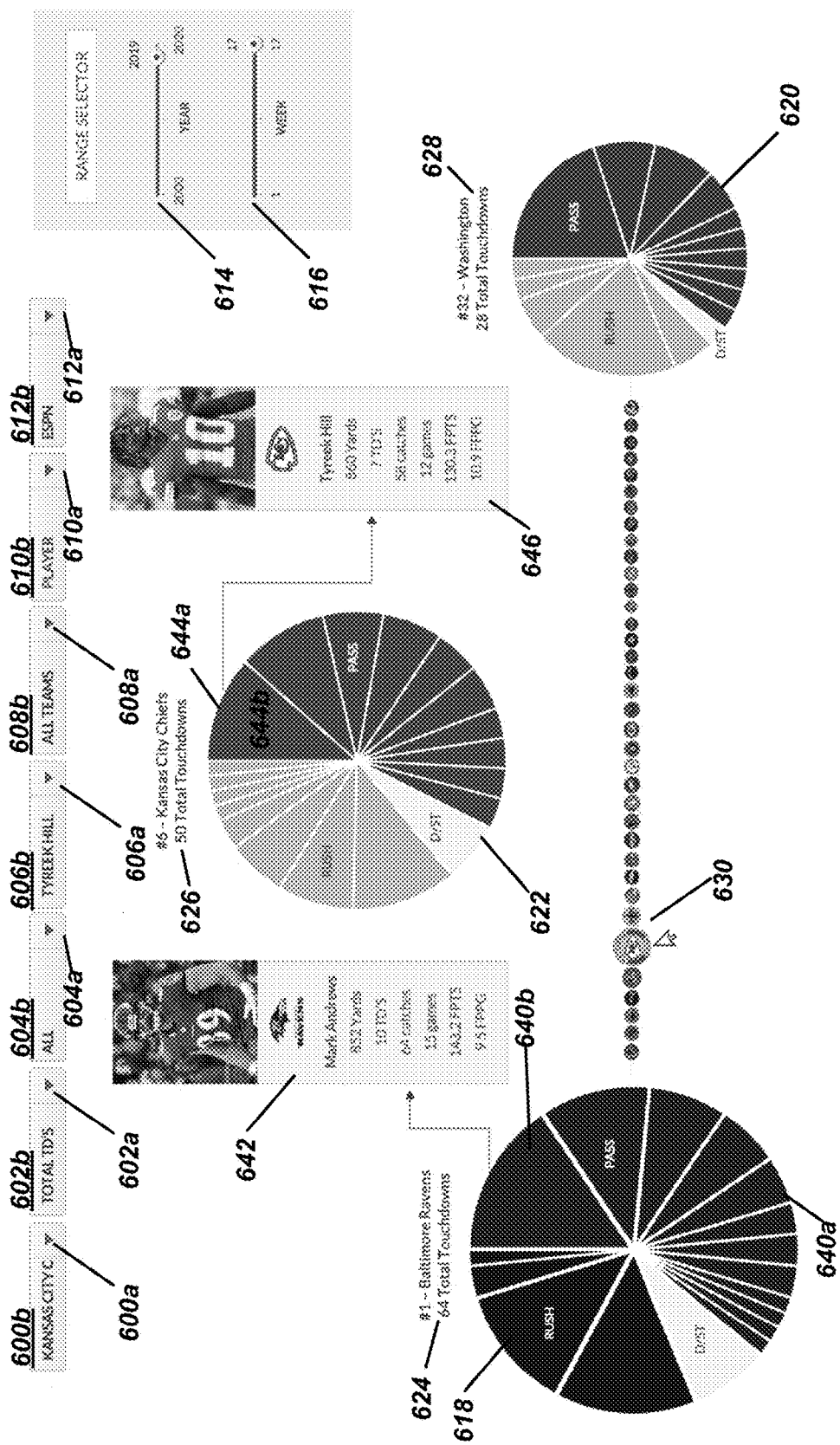
FIG. 6 is a depiction of a GUI interface for visualizing numerical and statistical data related to a sports league, comprising various charts, pulldown menus, sliders, toggle switches, wherein a user has made selections to visualize and compare a professional football team's total touchdowns across the duration of a previously played season against the total touchdowns of all other teams in the professional league across the duration of the previously played season, and further, to visualize the distribution of touchdown type, e.g., touchdowns scored by rushing, passing, or scored by defense/special teams.

In another implementation, a user may wish to examine various numerical and statistical data for previously played professional sporting events different than those discussed above, e.g. compare a professional football team's total touchdowns across the duration of a previously played season against the total touchdowns of all other teams in the professional league across the duration of the previously played season. The user may further wish to examine the distribution of touchdown type, e.g., touchdowns scored by rushing passing, or scored by defense/special teams. Turning now to FIG. 6, a GUI including visual representations of data for such a scenario are shown and described. In an implementation, the GUI includes dropdown menus 600a, 602*a*, 604*a*, 606*a*, 608*a*, 610*a*, and 612*a*. Dropdown menu 600*a* presents options for "teams," dropdown menu 602*a* presents options for "statistics," dropdown menu 604*a* present options for "position," dropdown menu 606*a* presents options for "player," dropdown menu 608*a* presents options for "compare to," dropdown menu 610*a* presents options for "2$^{nd}$ player," and dropdown menu 612*a* presents options for "fantasy scoring." Unless otherwise stated, the functionalities of these features as described above in connection with FIG. 1 apply to FIG. 6, with the additional features and functionalities discussed below. A skilled artisan will understand that the functionalities of features described above in connection with FIG. 1 are similarly provided by the corresponding elements of FIG. 6. The GUI further includes sliders 614 and 616. Slider 614 may be manipulated by the user to select a date range for the numerical and statistical data displayed in pie charts 618, 620, and 622, and slider 616 may be manipulated by the user select a range of weeks of data for any given year.

In an implementation, for the scenario described above, i.e., a user wishing to compare a professional football team's total touchdowns across the duration of a previously played season against the total touchdowns of all other teams in the professional league across the duration of the previously played season, and further, wishing to examine the distribution of touchdown type, e.g., touchdowns scored by rushing, passing, or scored by defense/special teams, the following selections may be made by the user: selection 600*b*, Kansas City, may be made from dropdown menu 600*a*, teams; selection 602*b*, total touchdowns (TD), may be made from dropdown menu 602*a*, statistics; selection 604*b*, all, may be made from dropdown menu 604*a*, position; selection 606*b*, T. Hill, may be made from dropdown menu 606*a*, 1st player; selection 608*b*, all teams, may be made from dropdown menu 608*a*, compare to; selection 610*b*, none, may be made from dropdown menu 610*a*, 2$^{nd}$ player; selection 612*b*, ESPN scoring, may be made from dropdown menu 612*a*, fantasy scoring. Slider 614 is positioned at the year 2019 and slider 616 is positioned to span all 17 weeks of the 2019 season. These selections by the user may direct the system to generate pie charts 618, 620, and 622 and visualize the numerical and statistical data for the selections made.

In an implementation, pie charts 618, 620, and 622 are positioned along a continuous line 630, in descending order of total touchdowns by professional teams from left to right. As indicated by its left-most position on line 630 and label 624, the Baltimore Ravens have the most total touchdowns (64) in the league, ranking 1$^{st}$ and the total touchdown data for the Baltimore Ravens is represented by pie chart 618. As indicated by its right-most position on line 630 and label 628, the Washington Football Team have the fewest total touchdowns (28) in the league, ranking, 32$^{nd}$, and the total touchdown data for the Washington Football Team is represented by pie chart 620. Because the user has made selection 600*b*, Kansas City Chiefs, from dropdown menu 600*a*, pie chart 622 representing total touchdown data for the Kansas City Chiefs is positioned in the center of the display and an arrow pointing to continuous line 630 indicates the relative rank of the Kansas City Chiefs in the league with respect to total touchdowns. Label 626 also represents the relative rank of the team, indicating the team ranks 6$^{th}$ in total touchdowns (50).

In another implementation, a user may make the selections described above with the modification of making a selection 600*b*, none, from dropdown menu 600*a*, team. In such a combination of selections, only pie charts 618 and 620 are displayed, representing total touchdown data for the 1$^{st}$ ranked Baltimore Ravens and the 32$^{nd}$ ranked Washington Football Team, respectively, with pie charts 618 and 620 being connected by continuous line 630. In some implementations, team logos or initials may be represented along continuous line 630 in descending order of total touchdowns from left to right. In an implementation, a user may wish to view the numerical data and statistics for a team selected from those displayed along continuous line 630. The user may click the team's logos or initials along continuous line 630 with a mouse cursor, after which a pie chart representing the team's total touchdown data will be displayed at the center of the display in the manner that pie chart 622 is displayed at the center of the display, representing the total touchdown data for the 6$^{th}$ ranked Kansas City Chiefs. This action, clicking a team's logos or initials along continuous line 630 to generate a pie chart at the center of the display has the same effect as making a selection of a team from dropdown menu 600*a*, teams. A user may utilize either dropdown menu 600*a* or the teams' logos or initials along continuous line 630 to change the team whose data is represented by a pie chart at the center of the display.

In an implementation, each of pie charts 618, 620, and 622 are further divided into slices, wherein each slice represents that portion of a team's total touchdowns by type of touchdown, e.g., touchdowns scored by rushing, passing, or scored by defense/special teams. Further, each slice is further divided into sub-slices, wherein each sub-slice represents the touchdown data for an individual player within that touchdown type. For example, slice 640*a* represents touchdowns made by passing by the Baltimore Ravens across the duration of the 2019 season, and sub-slice 640*b* represents the number of touchdowns made by passing to M. Andrews of the Baltimore Ravens across the duration of the 2019 season.

In some implementations, the GUI displaying data comparing a professional football team's total touchdowns across the duration of a previously played season against the total touchdowns of all other teams in the professional league across the duration of the previously played season, and further, displaying the distribution of touchdown type, e.g., touchdowns scored by rushing, passing, or scored by defense/special teams may contain additional functionalities, e.g., mouse-over functionalities, pop-ups, animations, three-dimensional renderings, among other functionalities. In an implementation, a user may wish to derive additional information with respect to a team's distribution of total touchdowns by type of touchdown, and visualize which players scored those touchdowns. For example, a user may hover their mouse cursor over sub-slice 640*a*, causing pop-up window 642 to appear for the duration that the mouse cursor is hovered over sub-slice 640*a*. Pop-up window 642 may comprise additional numerical and statistical information corresponding to the data represented by slice 642, i.e., the name of the player represented by that sub-slice, the number of touchdowns represented by the sub-slice, among other statistical and numerical data.

In another implementation, a user may wish to know more information about an individual player represented by the sub-slices representing touchdown data, e.g., a user may wish to know more about the player whose touchdown data is represented by sub-slice 644*b*. In an implementation, a user may click sub-slice 644*b* with a mouse cursor, causing pop-up window 646 to appear and remain on the display, and further, cause sub-slice 644*b* to be highlighted, and in some implementations to be depicted as a three-dimensional pop-out, as an animated feature, or with other functionalities to visually highlight the touchdown data for T. Hill to the user. Pop-up window 646 may contain additional numerical and statistical data for player T. Hill across the duration of the 2019 season. The action of clicking sub-slice 644*b* with a mouse cursor may be functionally equivalent to making a selection 606*b*, T. Hill, from dropdown menu 606*a*. A user may utilize either dropdown menu 606*a* or may click a specific sub-slice to change the player whose data is represented by pop-up window 646.

Figure 7:
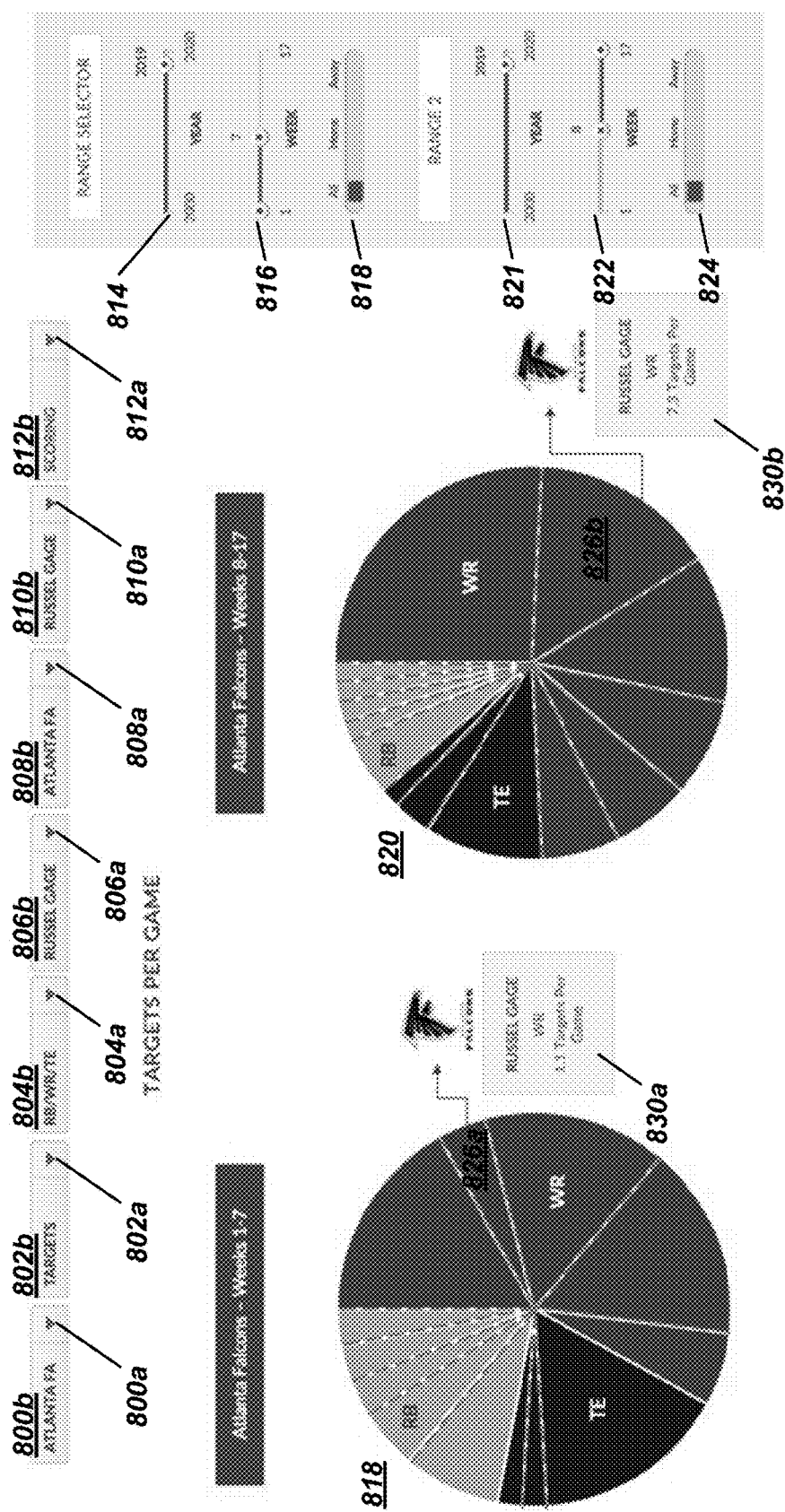
FIG. 7 is a depiction of a GUI interface for visualizing numerical and statistical data related to a sports league, comprising various charts, pulldown menus, sliders, toggle switches, wherein a user has made selections to visualize and examine various numerical and statistical data relating to the performance of a professional football team for the duration a first period of time in comparison to the performance of that same professional football team for the duration a second period of time.

In another implementation, a user may wish to visualize and examine various numerical and statistical data relating to the performance of a professional football team for the duration a first period of time in comparison to the performance of that same professional football team for the duration a second period of time. The user may further wish to examine the effects of the gain or loss of a player from one period of time to another, e.g., as the result of trades, injuries, and the like. Turning now to FIG. 7, a GUI including visual representations of data for such a scenario are shown and described. In an implementation, the GUI includes dropdown menus 800*a*, 802*a*, 804*a*, 806*a*, 808*a*, 810*a*, and 812*a*. Dropdown menu 800*a* presents options for "teams," dropdown menu 802*a* presents options for "statistics," dropdown menu 804*a* present options for "position," dropdown menu 806*a* presents options for "player," dropdown menu 808*a* presents options for "compare to," dropdown menu 810*a* presents options for "$2^{nd}$ player," and dropdown menu 812*a* presents options for "fantasy scoring." Unless otherwise stated, the functionalities of these features as described above in connection with FIG. 1 apply to FIG. 7, with the additional features and functionalities discussed below. A skilled artisan will understand that the functionalities of features described above in connection with FIG. 1 are similarly provided by the corresponding elements of FIG. 7. The GUI further includes sliders 814, 816, 821, and 822. Slider 814 may be manipulated by the user to select a first date range for the numerical and statistical data displayed in pie chart 818, slider 816 may be manipulated by the user to select a first range of weeks of data for any given year, slider 821 may be manipulated by the user to select a second date range for the numerical and statistical data displayed in pie chart 820, and slider 822 may be manipulated by the user to select a first range of weeks of data for any given year.

In an implementation, for the scenario described above, i.e., a user wishing to visualize and examine various numerical and statistical data relating to the performance of a professional football team for the duration a first period of time in comparison to the performance of that same professional football team for the duration a second period of time, the following selections may be made by the user: selection 800*b*, Atlanta Falcons, may be made from dropdown menu 800*a*, teams; selection 802*b*, targets per game, may be made from dropdown menu 802*a*, statistics; selection 804*b*, RB/WR/TE, may be made from dropdown menu 804*a*, position; selection 806*b*, all, may be made from dropdown menu 806*a*, $1^{st}$ player. Making these selections may generate a first pie chart 818, representing the data selected by the user. In an implementation, the user may proceed to make selection 808*b*, Atlanta Falcons, from dropdown menu 808*a*, compare to. Because the user has selected the same team, Atlanta Falcons, from both dropdown menus 800*a*, team, and 808*a*, compare to, several additional functionalities may be included in the GUI including pie chart 820, sliders 821 and 822, and toggle switches 818 and 824. The user may proceed to make selection 810*b*, all, from dropdown menu 810*a*, $2^{nd}$ player.

In an implementation, pie chart 818 represents data for the user-defined time ranges selected by sliders 816 and 818. Pie chart 820 represents data for the user-defined time ranges selected by sliders 821 and 822. In an implementation, a user may define a first period of time, for example, weeks 1-7 of the 2019 season, using sliders 814 and 816, and a second period of time, for example, weeks 8-17 of the 2019 season, using sliders 821 and 822. The user may then directly compare the data for the Atlanta Falcons during weeks 1-7 of the 2019 season to the data for the Atlanta Falcons during weeks 8-17 of the 2019 season by visual inspection of pie charts 818 and 820, respectively.

In an implementation, a user may use a mouse cursor to click on slice 826*a*, an action which in some implementations generates a first pop-up window 830 containing the player's name and additional numerical and statistical information corresponding to the player's performance for the time period selected using sliders 814 and 816, and a second pop-up window 830*b* containing the player's name and additional numerical and statistical information corresponding to the player's performance for the time period selected using sliders 821 and 822. For example a user may use a mouse cursor to click on slice 826*a* representing data for player R. Gage, whose data for weeks 1-7 of the 2019 season are represented by slice 826*a* and pop-up window 830*a* and data for weeks 8-17 of the 2019 season are represented by slice 826*b* and pop-up window 830*b*. A user may then directly compare the data for the R. Gage during weeks 1-7 of the 2019 season to the data for the R. Gage during weeks 8-17 of the 2019 season by visual inspection of slices 826*a* and 826*b* respectively and pop-up windows 830*a* and 830*b* respectively. In an implementation a user may click slice 826*a* with a mouse cursor, causing pop-up windows 830*a* and 830*b* to appear and remain on the display, and further, cause slices 826*a* and 826*b* to be highlighted, and in some implementations to be depicted as a three-dimensional pop-out, as an animated feature, or with other functionalities to visually highlight the performance data for R. Gage to the user.

In an implementation, in the case that a user has selected the same team from both dropdown menus 800*a* and 808*a*, e.g., selection 800*b*, Atlanta Falcons, has been made from dropdown menu 800*a*, teams and selection 808*b*, Atlanta Falcons, has been made from dropdown menu 808*a*, teams, toggle switches 818 and 824 may be visualized on the GUI display. Toggle switches 818 and 824 each have three positions, including "all," "home," and "away," corresponding to all games played during the time periods defined by sliders 814, 816, 821, and 822, games played at home during those time periods, or games played away during those time periods. The "all" position is the default position, and manipulating toggle switches 818 and 824 may allow the user to compare a team's performance in its home stadium to that same team's performance in away stadiums for the duration of two different time periods defined by sliders 814, 816, 821, and 822 as described above.

Figure 8:
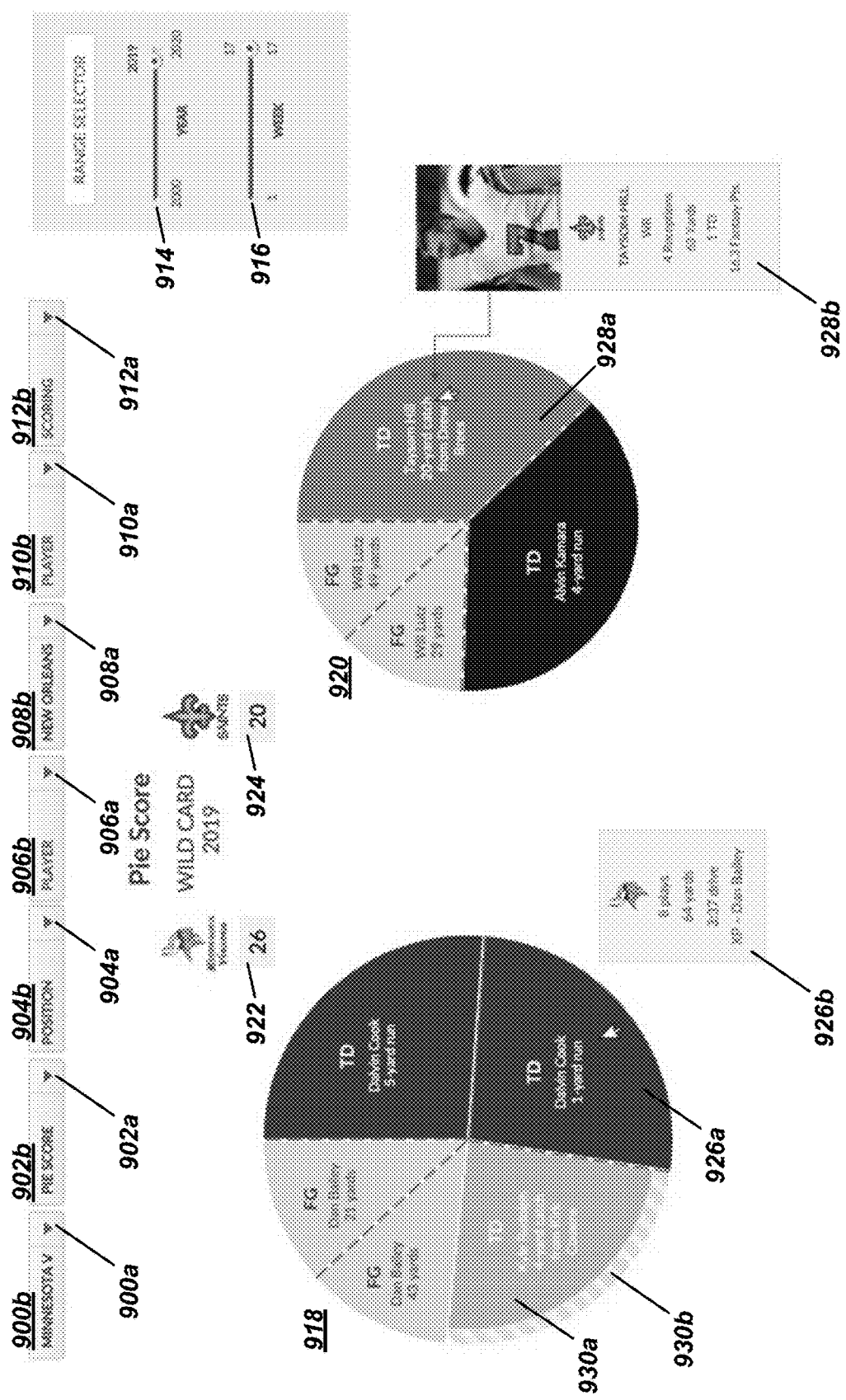
FIG. 8 is a depiction of a GUI interface for visualizing numerical and statistical data related to a sports league, comprising various charts, pulldown menus, sliders, toggle switches, wherein the user has made selections to visualize and examine a summary of the results of a single sporting event between two opposing teams, and further, to examine the manner in which points were scored by each team.

In another implementation, a user may wish to visualize and examine various numerical and statistical data relating to a summary of the results of a single sporting event between two opposing teams. The user may further wish to examine the manner in which points were scored by each team or may wish to view video replay of a particular scoring event during the sporting event. Turning now to FIG. 8, a GUI including visual representations of data for such a scenario are shown and described. In an implementation, the GUI includes dropdown menus 900*a*, 902*a*, 904*a*, 906*a*, 908*a*, 910*a*, and 912*a*. Dropdown menu 900*a* presents options for "teams," dropdown menu 902a presents options for "statistics," dropdown menu 904a present options for "position," dropdown menu 906a presents options for "player," dropdown menu 908a presents options for "compare to," dropdown menu 910a presents options for "$2^{nd}$ player," and dropdown menu 912a presents options for "fantasy scoring." Unless otherwise stated, the functionalities of these features as described above in connection with FIG. 1 apply to FIG. 8, with the additional features and functionalities discussed below. A skilled artisan will understand that the functionalities of features described above in connection with FIG. 1 are similarly provided by the corresponding elements of FIG. 8. The GUI further includes sliders 914 and 916. Slider 914 may be manipulated by the user to select a sports season for the numerical and statistical data displayed in pie charts 918 and 920, and slider 916 may be manipulated by the user to select a week of data for the selected year for the numerical and statistical data displayed in pie charts 918 and 920.

In an implementation, for the scenario described above, i.e., a user wishing to visualize and examine various numerical and statistical data relating to a summary of the results of a single sporting event and further wishing to examine the manner in which points were scored or wishing to view video replay of a particular scoring event during the sporting event, the following selections may be made by the user: selection 900b, Minnesota Vikings, may be made from dropdown menu 900a, teams; selection 902b, pie score, may be made from dropdown menu 902a, statistics; and selection 908bb, New Orleans Saints, may be made from dropdown menu 908a, compare to. Making these selections may generate a first pie chart 918, representing the data for the Minnesota Vikings and a second pie chart 920 representing data for the New Orleans Saints. The user may also manipulate slider 914 to select a playing season, e.g., 2019, and may manipulate slider 916 to select a playing week of the season, e.g., week 17 of the 2019 season.

In an implementation, the sizes of the pie charts displayed by the GUI are correlated with the final score of the game selected by the user, for example, pie charts 918 and 920 are proportionately sized to reflect the final score of the selected game, score 922 (26 points) for the Minnesota Vikings and score 924 (20 points) for the New Orleans Saints, Pie chart 918 is 30% larger than pie chart 920, proportionately representing the final score.

In an implementation, each of pie charts 918 and 920 are divided into four regions or slices labeled in different colors. In some implementations the colors default to correspond to the selected team's uniform colors in the professional sports league. In some implementations, as a default setting, the slices each correspond to a scoring play, and the arc length of each slice proportionately corresponds to the number of points that were scored by the play that the slice represents. For example, as depicted in FIG. 8, slice 926a represents a touchdown scored by Dalvin Cook that involved a 1-yard run. In an implementation the slices may be color coded to distinguish the type of scoring play, for example, to distinguish between running touchdowns, passing touchdowns, or defense or special teams scoring plays. In an implementation, touchdown scoring plays may be defined to include extra points and two point conversions. In an implementation, if a kicker misses an extra point or a team fails on a two point conversion attempt, a shaded region on the edge of the pie chart will represent the failure to score additional points, for example, region 930b represents a failure to score additional points after the passing touchdown represented by slice 930a, and the arc length of slice 930a is proportionately smaller than slice 926a, corresponding to the fewer points scored by that play. In an implementation, each slice may be labeled with the name of player who scored during the play, and additional information about the scoring play, e.g., yards run, yards passed, or the length of a field goal.

In some implementations, the GUI displaying data relating to a summary of the results of a single sporting event may contain additional functionalities, e.g., mouse-over functionalities, pop-ups, animations, three-dimensional renderings, among other functionalities. In an implementation, a user may wish to derive additional information for each scoring play represented by slices of the displayed pie charts, and conveniently visualize this additional information. For example, the user may hover a mouse cursor over a slice, e.g. the user may hover a mouse cursor over slice 926a. This action in some implementations generates a pop-up window 926b that displays additional information the drive that led to the scoring event represented by the slice, e.g. number of plays, yards, length of time that the drive took, among other additional data. In another implementation, the user may hover a mouse cursor over a player's name within a slice, e.g. the user may hover a mouse cursor over slice the name Tayson Hill within slice 928a. This action in some implementations generates a pop-up window 928b that displays additional information relating to that individual player's performance during the selected sporting event, e.g. position played, number of receptions, yards, touchdowns, fantasy points scored, among other additional data.

Figure 9:
FIG. 9 is a depiction of a GUI comprising a video playback window, wherein a user has made a selection to view video replay of a particular scoring event during the sporting event.

In some implementations, rather than only hovering a mouse cursor over the slice 926a as described above, a user may click on the slice, an action which generates a video window 1000 depicted in FIG. 9. Turning now to FIG. 9, in an implementation, a user has used a mouse cursor to click on slice 926a, which has generated a video window. In an implementation the video window may display a video replay of the scoring event represented on the slice that was clicked, for example, video window 1000 may replay video of the touchdown scored by Dalvin Cook that is represented by slice 926a, which was clicked by the user. The video replay displayed in video window 1000 may play on repeat until the user stops the replay by clicking in another region of the GUI display, or in some implementations by "swiping" across the video window on a touchscreen.

The computing device on which the systems and methods disclosed herein are implemented may include a central processing unit, memory, input devices (e.g., keyboards, pointing devices, touch screens, mobile devices), output devices (e.g., display devices), and storage devices (e.g., disk drives or other non-volatile storage media). The memory and storage devices are computer-readable storage media that may be encoded with computer-executable instructions (e.g., software) that implement or enable the system. In addition, the data structures and message structures may be stored on computer-readable storage media. Any computer-readable media claimed herein include only those media falling within statutorily patentable categories. The system may also include one or more communication links over which data can be transmitted. Various communication links may be used, such as the Internet, a local area network, a wide area network, a point-to-point dial-up connection, a cell phone network, and so on.

Embodiments of the system and methods disclosed herein may be implemented in various operating environments that include personal computers, server computers, handheld or laptop devices, multiprocessor systems, microprocessor-based systems, programmable consumer electronics, digital cameras, network PCs, minicomputers, mainframe computers, distributed computing environments that include any of the above systems or devices, set top boxes, systems on a chip (SOCs), and so on. The computer systems may be cell phones, personal digital assistants, smart phones, personal computers, programmable consumer electronics, digital cameras, and so on.

The system may be described in the general context of computer-executable instructions, such as program modules, executed by one or more computers or other devices. Program modules include routines, programs, objects, components, data structures, and so on that perform tasks or implement abstract data types. Typically, the functionality of the program modules may be combined or distributed as desired in various embodiments.

While certain embodiments have been described, these embodiments have been presented by way of example only and are not intended to limit the scope of the present disclosures. Indeed, the novel methods, apparatuses and systems described herein can be embodied in a variety of other forms; furthermore, various omissions, substitutions and changes in the form of the methods, apparatuses and systems described herein can be made without departing from the spirit of the present disclosures. The accompanying claims and their equivalents are intended to cover such forms or modifications as would fall within the scope and spirit of the present disclosures.

What is claimed is:

1. A computer-implemented method for compiling and visualizing box score data, the method comprising:
   providing a first graphic displaying box score data associated with a first team filtered by at least position and statistic, the first graphic comprising a first pie chart having multiple visually distinct subsections, each subsection reflecting a respective data metric for the selected position, wherein
      each subsection further includes a plurality of embedded pie slices representing a portion of the respective data metric, each respective slice of the plurality of embedded pie slices extending from a center of the first pie chart toward an outer circumference of the first pie chart, wherein
         the respective slice extends a distance proportional to a corresponding contribution of the portion to a total value of the data metric, and
         the first graphic reflects a team having the largest box score for the selected position and statistic;
   providing a second graphic displaying box score data associated with a second team filtered by at least position and statistic, the second graphic comprising a second pie chart having multiple visually distinct subsections, each subsection reflecting data for the selected position, wherein
      each subsection further includes a plurality of embedded pie slices representing a portion of the respective data metric, each respective slice of the plurality of embedded pie slices extending from a center of the second pie chart toward an outer circumference of the second pie chart, wherein
         the respective slice extends a distance proportional to a corresponding contribution of the portion to a total value of the data metric, and
         the second graphic reflects a team having the smallest box score for the selected position and statistic;
   providing a linear array of icons spanning between the first graphic and the second graphic, the icons arranged in an order from smallest to greatest box scores for the selected position and statistic; and
   providing, in response to a user selection of an icon, a third graphic adjacent the linear array of icons displaying box score data associated with a third team filtered by at least position and statistic, the third graphic comprising a third pie chart having multiple visually distinct subsections, each subsection reflecting data for the selected position, wherein
      each subsection further includes a plurality of embedded pie slices representing a portion of the respective data metric, each respective slice of the plurality of embedded pie slices extending from a center of the third pie chart toward an outer circumference of the third pie chart, wherein
         the respective slice extends a distance proportional to a corresponding contribution of the portion to a total value of the data metric.

* * * * *